3,369,865
PROCESS FOR ION EXCHANGING CRYSTALLINE ZEOLITES
William Judson Mattox and Elroy Merle Gladrow, Baton Rouge, La., assignors to Esso Research and Engineering Company, a corporation of Delaware
No Drawing. Filed July 6, 1965, Ser. No. 469,884
11 Claims. (Cl. 23—112)

This invention relates to crystalline alumino-silicate zeolites and particularly to an improved method for ion exchanging such zeolites to introduce desired cations.

Crystalline alumino-silicate zeolites, commonly referred to as "molecular sieves," are well known in the art. They are characterized by their highly ordered crystalline structure and uniformly dimensioned pores, and are distinguishable from each other on the basis of composition, crystal structure, adsorption properties, and the like. The term "molecular sieves" is derived from the ability of these zeolite materials to selectively adsorb molecules on the basis of their size and form. The various types of molecular sieves may be classified according to the size of the molecules which will be rejected (i.e. not adsorbed) by a particular sieve. In addition to their extensive use as adsorbents for hydrocarbon separation processes and the like, it has recently been found that crystalline alumino-silicate zeolites, particularly after cation exchange to reduce alkali metal oxide content, are valuable catalytic materials for various processes, particularly hydrocarbon conversion processes, e.g. catalytic cracking, hydrocracking, etc.

In general, the crystalline alumino-silicate zeolites within the purview of the present invention may be represented by the following formula, expressed in terms of moles:

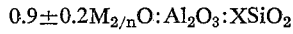

$$0.9 \pm 0.2 M_{2/n}O : Al_2O_3 : XSiO_2$$

wherein M is selected from the group consisting of metal cations and hydrogen, $n$ is its valence, and X is a number from about 1.5 to about 12. The value of X will vary with the particular zeolite in question. Among the well-known natural zeolites are mordenite, faujasite, chabazite, gmelinite, analcite, erionite, etc. Such zeolites differ in structure, composition, and particularly in the ratio of silica to alumina contained in the crystal lattice structure; e.g. mordenite, having a ratio of about 8 to about 12; faujasite, having a ratio of about 2.5 to about 7; etc. Similarly, the various types of synthetic crystalline zeolites, e.g. faujasite, will also have varying silica to alumina ratios depending upon such variables as composition of crystallization mixture, reaction conditions, etc. U.S. Patents Nos. 3,013,982–86 described a number of synthetic zeolites, designated therein as zeolites A, D, L, R, S, T, X and Y.

The processes for producing such crystalline synthetic zeolites are well known in the art. Typically, they involve crystallization from reaction mixtures containing: $Al_2O_3$ as sodium aluminate, alumina sol and the like; $SiO_2$ as sodium silicate and/or silica gel and/or silica sol; alkali metal oxide, e.g. sodium hydroxide, either free or in combination with the above components; and water. Careful control is kept over the alkali metal oxide concentration of the mixture, the proportions of silica to alumina and alkali metal oxide to silica, the crystallization period, etc., to obtain the desired product. The product is then usually calcined at elevated temperature, e.g. 1000° F., in order to remove water of hydration and thereby form interstitial channels which confer adsorptive and catalytic properties.

For various applications, it is desirable to replace the alkali metal, e.g. sodium, cation portion of the crystalline zeolite structure with a different cation. Such replacement may, for example, be desired to alter the pore size of the zeolite which, although uniform throughout any particular zeolite type, can be changed by the substitution of certain cations. For example, in the case of those zeolites which have been labeled Type A zeolites having uniform pore openings of a diameter of about 4 A. as initially prepared, replacement of the sodium ions with calcium or magnesium cations causes an increase in the pore diameter to about 5 A., thereby altering the adsorption properties of the zeolite. Another equally important instance, wherein replacement of the sodium cations initially present in the zeolite structure with other cations is desirable, is in the application of crystalline zeolites as catalysts for organic conversions such as hydrocarbon conversion reactions. In these applications, the crystalline zeolite is usually subjected to ion exchange with a metal cation or a hydrogen or hydrogen-containing cation, or mixtures thereof, in order to reduce the zeolitic alkali metal content, for example, to less than about 10 wt. percent (as $Na_2O$), more typically less than about 5 wt. percent. This is desirable in view of the deleterious effect that alkali metals can have in such conversion reactions, as well as certain beneficial effects upon the catalytic properties of the zeolite which can be obtained by the reduction of alkali metal content and the introduction of desired cations.

For whatever purpose desired, this ion exchange has generally been performed by conventional procedures such as by slurrying the zeolite crystals in a suitable salt solution of the desired cations at a suitable temperature and pressure in batchwise or semi-continuous manner. It is the purpose of the present invention to provide an improved method for ion exchanging crystalline alumino-silicate zeolites, by batchwise but more preferably by continuous procedures, in such manner as to substantially reduce the overall cost of manufacture by eliminating the separation of the zeolite crystals from their mother liquor prior to the ion exchange procedure. As hereinbefore mentioned, conventional synthesis procedures for crystalline alumino-silicate zeolites generally involve crystallization of the zeolite from a suitable reaction mixture, followed by a distinct separation of the zeolite product from the aqueous mother liquor by decantation, filtration, or the like, followed by washing, drying, calcining, etc. Ion exchange is then performed on the separated dried product crystals. The principal contribution contemplated by the present invention is to effect ion exchange of the zeolite crystals contained in their mother liquor, thus eliminating the distinct separation of the zeolite product crystals from the mother liquor as well as the various intermediate steps of filtering, washing, drying, reslurrying, etc.

Briefly, the process of the invention involves the admixture of (1) zeolite product crystals contained in their mother liquor, with (2) solid particles of a cation exchange material or resin which is in the desired cation form; i.e. contains the cation desired to be introduced into the crystalline zeolite. As mentioned, this admixture can be performed batchwise, but preferably the process is conducted on a continuous columnwise basis wherein the slurry of zeolite crystals in their mother liquor is passed upwardly through a bed of the cationic exchange resin at a controlled rate so that the zeolite crystals are taken overhead in the desired cation form while the exchange resin particles remain behind in the ion exchange column. The zeolite crystals are then separated as in conventional processes, washed, if desired, dried and calcined. They are thus immediately recovered in the desired cationic form without the necessity for additional ion exchange treatment. The economic savings attributable to this procedure are substantial and the present invention therefore presents a truly remarkable and unexpected innovation.

The presence of the zeolite crystals in their mother liquor enables realization of the economic advantage associated with the present process by elimination of the costly separation of the zeolite crystals from their mother liquor. Furthermore, the zeolite mother liquor normally resulting from the crystallization reaction is alkaline in nature and contains an excess of alkali metal, e.g. sodium, cations resulting from unreacted alkali metal oxide. The presence of these cations is desired since they will aid in the overall exchange of ions by first replacing the cations contained in the resin, which latter cations will successively replace the alkali metal cations of the zeolite. As an illustration, passage of a mother liquor slurry of sodium-form zeolite crystals through a bed of cation exchange resin in the acid form, will cause the sodium cations of the aqueous mother liquor to exchange with the hydrogen ions of the resin; the hydrogen ions of the resin will then enter the mother liquor phase and will in turn replace the sodium ions of the zeolite crystals. In this manner, a desired cation, in this case hydrogen ion, will be substituted for the sodium cations in the original zeolite crystals, without the necessity for first separating such crystals and then subjecting them to a separate ion exchange procedure.

The process of the invention can be conducted on a batchwise basis, in which case the particles of cation exchange resin should be of a differenct size than the zeolite crystals being treated so that subsequently the cation exchange material can be separated from the zeolite particles by simple methods such as screening. In the continuous columnwise version of the present process, the zeolite crystals as normally produced by known preparation techniques have a sufficiently low density when suspended in typical mother liquor solutions as to readily pass upwardly through the column of ion exchange particles, which particles are in turn held from upward movement by a screen or the like having openings small enough to retain the resin particles but large enough to allow free passage of the zeolite crystals in suspension. Upward flow of the suspension through the ion exchange particles is preferred to downward flow since with the latter the bed of exchange material may act as a filter and become plugged with retained zeolite particles. In the upflow technique, the action of the mother liquor medium suspends and separates the particles of cation exchange resin so that the suspension of zeolite crystals passes through the resin bed without filtering action. In addition to columnwise operation, a semi-continuous technique may be used wherein the zeolite-mother liquor suspension is added to a vessel containing a cation exchange resin, the mixture agitated, the zeolite crystals separated from the resin, and then passed to subsequent vessels for repetition of the procedure. A further alternative involves the simple batch technique wherein the zeolite-mother liquor suspension is mixed with the resin, the mixture agitated and thereafter separated.

The particle size of the zeolite crystals as normally produced is ideal for the purposes of the present invention. The particles should not be too small so as to result in a colloidal solution, but should preferably be smaller than the particles of cation resin. In any case, however, the particle size of the resin and the particle size of the zeolite crystals should be different so that the two can be separated in the batchwise and semi-continuous techniques. In the columnwise technique, the particle size of the zeolite crystals should be sufficient so as to have a density when suspended in the mother liquor which will allow the crystal suspension to be readily passed upwardly through the resin bed.

The cation exchange resin used in the present invention may be any one of the large number of commercially available materials. Resins comprising cross-linked resinous polymers of monovinyl aromatic monomers and polyvinyl compounds are well known and are generally prepared by copolymerizing in the presence of a catalyst one or more monovinyl aromatic compounds, such as styrene, vinyl toluene, vinyl xylene, with one or more divinyl aromatic compounds such as divinyl benzene, divinyl toluene, divinyl xylene, divinyl naphthalene, and divinyl acetylene. Following copolymerization, the resins are further treated with suitable acids, for example, to convert the matrix into a cation exchanger. Exemplary materials include Amberlite IR-120 which is a very high capacity, strongly acidic nuclear sulfonic acid type cation exchanger produced by the Rohm & Haas Co., Philadelphia, Pa.; and Dowex-50, made by sulfonating a copolymer of styrene and divinylbenzene, produced by Dow Chemical Co., Midland, Mich.

In accordance with the present invention, the cation exchange resin is used in a form containing a cation desired to be introduced into the crystalline zeolite. Thus, where the desired cation is a hydrogen or ammonium ion the resin will be used in the acid or ammonium form. Similarly, where it is desired to introduce metal cations into the crystalline zeolite; that is, metal cations other than alkali metal cations, the resin will be used in a form containing these desired metal cations, which will usually necessitate pretreating the resin with a solution containing such desired cations.

The metal cation to be introduced into the crystalline zeolite by replacement of alkali metal cations initially present in the zeolite structure can be a cation of any metal in Groups I-B to VIII of the Periodic Table, including the rare earth metals, and preferably is a cation of a polyvalent metal selected from the group consisting of metals in Groups II, III, IV, V, VI-B, VII-B, VIII, the rare earth metals, and mixtures thereof. Representative examples of metal cations suitable for use in the ion exchange process of the invention include cations of aluminum; barium; cadmium; rare earth metals, such as cerium, praseodynium, lanthanum, neodymium, yttrium and samarium; chromium; tungsten; cobalt; copper; iron; lead; lithium; manganese; nickel; silver; strontium; zinc; tin; platinum; palladium; molybdenum; vandium; rhodium; and zirconium. The preferred cations will depend upon the particular application in which the zeolite is to be used. For hydrocarbon conversion reactions, hydrogen or hydrogen-containing cations such as ammonium, and cations of metals in Groups I-B, II, III, VI-B, and VIII will be preferred; for cracking and hydrocracking, for example, alkaline earth metal cations, particularly magnesium or calcium, as well as zinc, aluminum, and hydrogen cations and mixtures thereof will be preferred. Where it is desired to incorporate two or more different cations, this may be readily accomplished by either using two columns respectively containing exchange resins in different forms, or a mixture of two resins, each of which has been pretreated to the desired cation form.

Regeneration of the cation exchange resin is readily accomplished by known procedures. For example, the resin can be treated with a solution of acids such as sulfuric acid or hydrochloric acid and/or an ammonium salt such as ammonium sulfate or ammonium chloride. If a metal cation is desired to be introduced into the zeolite, the resin will be treated with an appropriate solution of such cation during the regeneration treatment.

The contact between the cation exchange resin and the crystalline zeolite in mother liquor slurry can be performed at any conditions suitable to achieve the desired degree of ion exchange; i.e. sufficient to reduce the alkali metal oxide content of the zeolite to the aforementioned levels. The precise conditions to be employed will, of course, depend upon the particular zeolite in question, its concentration in the mother liquor solution, the sodium ion concentration of the mother liquor solution, the presence of extraneous impurities, etc. Generally, however, temperatures of 70 to 212° F., particularly 120 to 180° F., and pressures of 0 to 50 p.s.i.g., e.g. atmospheric pressure, will be suitable. Similarly, the space velocity of the mother liquor zeolite slurry in the case of the columnwise operation, or the quantity of mother liquor slurry added to the resin and the number of treatments required in the case of the batchwise or the semi-continuous techniques, will also depend upon the aforementioned variables. The amount of resin to be employed can be readily calculated from the known exchange capacity of the resin and the amount of crystalline zeolite to be treated, taking into consideration the initial alkali metal content of the zeolite and the degree of alkali metal oxide reduction desired. Typical charges of the two materials and typical conditions for the ion exchange procedure will be set forth in the examples to follow. However, it should be clearly understood that the ratios of the two materials and the conditions utilized can be widely varied to achieve the desired result, and it is not the intent herein to exclude conventional variations which are well within the skill of the art. For example, it is well known that ion exchange procedures are facilitated by elevated temperature treatment, and the optimum temperature to be employed will depend again on the type of zeolite, the type of resin and the type of cation desired to be introduced into the zeolite. Similarly, owing to the extremely large number of crystalline zeolites available with corresponding preparation techniques, it will be readily observed that the mother liquor slurry of zeolite crystals will be subject to wide variations in concentration, pH, composition, etc., and any typical values disclosed herein are not to be regarded as limiting. Certain mother liquor slurries may, for example, be too concentrated for the particular particle size of the resin employed, etc., and can be diluted to increase fluidity in known manner.

The following description is intended to incorporate all of the preferred features of the present invention. It will be understood, however, that the scope of the present invention is substantially broader than the features herein presented and such features are not to be construed as limiting in any manner.

In accordance with a preferred process of the invention, a crystalline alumino-silicate zeolite having relatively large pore openings, e.g. 6 to 15 A., preferably 8 to 13 A., is prepared by the reaction of soda, silica, alumina and water. Preferably, the zeolite will be of the synthetic faujasite variety; that is, it will have a crystal structure very similar to the natural mineral faujasite. A particularly preferred type of synthetic faujasite will have a silica to alumina mol ratio above about 3, and preferably 4 to 6. In order to prepare such material, the reactants are supplied from suitable source materials in the following ratios: $SiO_2/Al_2O_3$, 4 to less than 8, preferably 5 to 7.5, e.g. 7.0; $Na_2O/SiO_2$, .28 to .55, preferably .30 to .40, e.g. 0.3; $H_2O/Na_2O$, 15 to 40, preferably 20 to 30, e.g. 23. These reactants can be supplied from the following source materials: sodium aluminate, sodium hydroxide, and colloidal silica sol. The crystallization of these reactants is conducted at elevated temperatures such as a temperature of 80 to 120° C., preferably 90 to 110° C., which is maintained for a period of about 5 to 50 hours, preferably 16 to 36 hours, during which time the synthetic sodium faujasite crystals are formed. The resulting slurry of faujasite crystals in mother liquor is then conventionally filtered to separate the faujasite product. In accordance with the present invention, however, the total mass of faujasite crystals and mother liquor is contacted with a cation exchange resin. The mother liquor phase of this slurry will usually contain the following amounts of the impurities and by-products: about 1.5 to 9.0 wt. percent $Na_2O$ in solution; about 3.0 to 10.0 wt. percent $SiO_2$ as soluble silicate. There will usually be present about 18 to 28 wt. percent of zeolite crystals and the mother liquor will typically have a pH of about 10 to 14 and a sodium ion concentration in solution of about 0.25 to 1.5 molal.

The total slurry of faujasite crystals in alkaline mother liquor is then passed upwardly through a column containing a suitable cation exchange resin such as Amberlite IR–120 at a space velocity of about 2 to 50, e.g. 10 to 30, w./w./hr. The cation exchange resin is preferably in the hydrogen or ammonium form but can also have been pretreated so as to contain other preferred cations such as magnesium, calcium, zinc and rare earth metals. As hereinbefore mentioned, the zeolite-mother liquor slurry may be diluted with water to increase its fluidity. It will be preferable to conduct the ion exchange at a temperature of about 150 to 180° F. in order to facilitate the cation exchange. Where the resin is in the ammonium form, an ammoniacal slurry of zeolite is taken overhead from the exchange column and is then subsequently treated for various intended uses. Where no further modification of the zeolite is required, the zeolite crystals are simply filtered from the total effluent, dried at typical temperatures of 200 to 325° F., and finally calcined to remove water of hydration at typical temperatures of 550 to 1100° F. In certain instances, it may be desired to modify the zeolite, as for example where it is to be used in catalytic operations, by the deposition of desired metals. For example, in various hydrocarbon conversion reactions, particularly hydrocracking, it will be desired to incorporate a hydrogenation component such as a platinum group metal, e.g. palladium. In this instance, the ammoniacal slurry of the crystalline zeolite taken from the ion exchange column can be passed directly into a mixing vessel to which a solution of a compound of the desired metal is added. In the case of palladium, for example, a solution of palladium ammonium chloride, tetra amino platinous chloride, etc., can be added. Thereupon the suspension of the zeolite in the dilute metal salt solution can be maintained by continued stirring, during which time the metal salts become deposited on the zeolite. The zeolite containing the desired hydrogenation metal is then filtered, washed, dried, and calcined. It may then be subjected to a reducing step to activate the deposited metal. Alternatively, the zeolite leaving the ion exchange vessel can be taken directly to a dewatering zone to reduce the amount of residual water and soluble salts, and the solid product then admixed with the metal salt solution as hereinbefore described.

It will be appreciated, of course, that the process of the invention is subject to conventional techniques and variations. For example, two or more ion exchange beds can be utilized in parallel, thereby permitting simultaneous exchange of zeolite and regeneration of spent resin. Where regeneration of the resin is desired, as will be the customary case, and the resin is utilized in the ammonium form as described above, such regeneration can be accomplished by a treatment with a 5 to 20% ammonium hydroxide and/or ammonium salt solution.

The advantages derived from the present process are manifold. For example, the process permits the continuous processing directly from the zeolite synthesis step through the ion exchange step and optionally through final zeolite modification steps such as metal impregnation. Also, contacting of the zeolite in the cation exchange zone is a highly efficient procedure simulating multiple base exchange treatments done in batchwise manner. Additionally, the process permits the utilization of the heat content of the sodium zeolite-mother liquor slurry directly in the cation exchange zone to thereby facilitate and promote the ion exchange. This is accomplished by passing the mother liquor slurry, without cooling, directly to the resin bed. Other advantages will be readily apparent, such as the minimization or elimination of handling losses in transferring the zeolite from step to step in the various batchwise processes, as well as a considerable decrease in processing time.

The invention will be further understood from the following examples which are not intended to be limiting.

Example 1

A crystalline alumino-silicate zeolite having a crystal structure similar to the natural mineral faujasite, a silica-to-alumina mole ratio of about 4.7 and uniform pore openings of about 13 A. was prepared from a reaction mixture containing silica, alumina, soda and water in the following mole ratios: $SiO_2/Al_2O_3$, 7:1; $Na_2O/Al_2O_3$, 2.2:1; $H_2O/SiO_2$, 10:1. The source of alumina and soda was a sodium aluminate liquor and the source of silica was a 40% colloidal silica sol. The crystallization of the synthetic faujasite product was performed at a temperature of about 210° F. over a period of about 30 hours. The total slurry of crystalline zeolite and mother liquor weighed about 20 lbs. and analyzed 34.3 wt. percent total solids, of which 23.8 wt. percent was the synthetic faujasite product, 3.9 wt. percent was soluble $Na_2O$, and 6.6 wt. percent was soluble $SiO_2$, the latter two being dissolved in the mother liquor. The slurry was diluted with about 4 lbs. of water to quench the crystallizing process and the crystallinity of the product was measured and found to be excellent. The crystalline product was sampled and found to have an empirical formula of $Na_2O \cdot Al_2O_3 \cdot 4.7\ SiO_2$. It had a sodium oxide content of 13.5 wt. percent. Thus, the total $Na_2O$ content of the slurry before dilution with water was 7.11 wt. percent $(0.135 \times 23.8 + 3.9)$. After the dilution with water, the sodium oxide content of the diluted slurry was about 5.9 wt. percent.

In a separate vessel, 4 lbs. of Amberlite IR–120 cation exchange resin were treated by soaking in excess

$NH_4Cl-NH_4OH$ solution to convert the resin to the ammonium form followed by water washing. Specifically, the 4 lbs. of resin were slurried in 3 liters of a solution containing 500 cc. concentrated $NH_4OH$ and 300 grams $NH_4Cl$, with intermediate washing followed by a second treatment with a similar solution. This quantity of resin had a cation exchange capacity of 9.08 equivalents.

The drained resin was wetted with 2 liters of water and then 1200 grams of the diluted slurry of zeolite crystals in mother liquor were added. This quantity of slurry contained about 68.4 grams of $Na_2O$, or about 2.21 equivalents. The mixture of cation exchange resin and slurry thus had an ammonium ion to sodium ion equivalents ratio of about 4.1:1. The mixture of resin and mother liquor slurry was then heated with stirring at 160° F. for about 100 minutes. The slurry of crystals was then removed by decanting with continued slow mixing of the slurry-resin mixture. The zeolite crystals, being substantially finer and lighter than the resin particles, remained in suspension whereas the resin particles fell to the bottom of the vessel. The separated slurry of zeolite crystals was then reduced in volume by partially drying in an oven, and the resin was regenerated with fresh $NH_4OH-NH_4Cl$ as originally described. The exchange treatment was then repeated two more times with intermediate regeneration of the resin. After each exchange treatment a small portion of the slurry was evaporated to dryness and calcined at 1000° F. Analysis of these samples showed that the $Na_2O$ content of about 20%, based on the solids contained in the original mother liquor, was reduced to 5.8 wt. percent after the first exchange, thence to 5.5 wt. percent after the second exchange and, finally, to 4.0 wt. percent after the third exchange. These results attest to the feasibility of base exchanging sodium from crystalline zeolites with cation exchange resins containing a suitable exchanging cation.

Example 2

A synthetic faujasite similar to that of Example 1 was prepared by essentially the same procedure. The mother liquor again analyzed about 34 wt. percent solids, of which the total $Na_2O$ content of the solids was again about 20 wt. percent. 300 cc. of the mother liquor slurry were diluted to a total volume of 720 cc. with water.

1000 grams of Amberlite IR–120 cation exchange resin was converted to the ammonium form by slurrying four times with a fresh solution containing 5 wt. percent ammonium sulfate and 10 wt. percent ammonium hydroxide using 2 liters of fresh solution for each treatment. The resin was washed thoroughly with water and then placed in a vertical column and allowed to settle. The settled bed of resin had a diameter of 4.5 cm. and a height of 75 cm. The bed was backwashed with water to remove excess salt solution and then maintained at a stable height of about 150 cm. by the continuous upflow of water through the resin.

The diluted mother liquor slurry of zeolite crystals was then injected at room temperature as a slug into the stream of upwardly flowing water. The slurry remained as a plug and passed upwards through the column and was taken as overhead effluent. No difficulty was experienced in separating the zeolite slurry from the resin bed. The flow rate of the upwardly flowing water was such that the zeolite crystals passed through the bed at a space velocity of about 18 w./w./hr. A portion of the overhead effluent was dewatered, oven dried and analyzed for sodium content and crystallinity. The analysis showed that the soda content of the zeolite had been reduced to 6.3 wt percent whereas the crystallinity was the same as the original product.

It is therefore quite evident that the process of the present invention, whether performed on a batchwise or columnwise basis, is a highly effective means for reducing the soda content of crystalline zeolites by direct treatment of the mother liquor slurry resulting from the zeolite synthesis. The slight advantage shown for the batchwise procedure of Example 1 is believed due to the elevated temperature utilized in that example rather than any superiority of batchwise treatment over columnwise treatment. As indicated, columnwise treatment will be preferred and it is to be expected that for the same conditions a more efficient and economical operation will result from columnwise treatment. Thus, further reductions in soda content can be effected in the columnwise treatment by using the hot mother liquor slurry as normally produced in the zeolite synthesis. Moreover, further improvement in the efficiency of exchange can be accomplished by increasing the height of the cation exchange resin bed.

What is claimed is:
1. A method for introducing a desired cation into a crystalline alumino-silicate zeolite by ion exchange thereof which comprises contacting a mother liquor slurry of crystals of said zeolite with a cation exchange resin containing said desired cation, and recovering zeolite crystals in the desired cation form.

2. The method of claim 1, wherein said mother liquor slurry and said cation exchange resin are admixed in batchwise manner.

3. The method of claim 1, wherein said mother liquor slurry is passed through a bed of said cation exchange resin in columnwise fashion.

4. The method of claim 1, wherein said desired cation is a hydrogen or hydrogen-containing cation.

5. The method of claim 1, wherein said desired cation is a metal cation.

6. The method of claim 5, wherein said metal is selected from Groups I–B, II, III, VI–B, or VIII of the Periodic Table.

7. The method of claim 5, wherein said metal is an alkaline earth metal including magnesium.

8. The method of claim 1, wherein said zeolite is of the synthetic faujasite variety.

9. The method of claim 8, wherein said zeolite has a silica-to-alumina mol ratio above about 3.

10. The method of claim 9, wherein said mother liquor contains about 1.5 to 9 wt. percent $Na_2O$ in solution.

11. A process for preparing a crystalline alumino-silicate zeolite containing a desired cation other than sodium which comprises (1) crystallizing said zeolite from a reaction mixture containing silica, alumina, soda and water in the following molar ratios: $SiO_2/Al_2O_3$, 4 to less than 8; $Na_2O/SiO_2$, 0.28 to 0.55; $H_2O/Na_2O$, 15 to 40; (2) contacting the mother liquor slurry of zeolite crystals obtained from step (1) with a cation exchange resin containing said desired cation; and (3) thereafter recovering said zeolite crystals in the desired cation form.

References Cited

UNITED STATES PATENTS

| 2,882,244 | 4/1959 | Milton | 23—113 |
| 3,130,007 | 4/1964 | Breck | 23—113 |
| 3,236,762 | 2/1966 | Rabo et al. | 252—455 X |

EDWARD J. MEROS, *Primary Examiner.*